United States Patent [19]

Green et al.

[11] Patent Number: 5,993,201
[45] Date of Patent: Nov. 30, 1999

[54] ENCLOSED FRICTIONALLY IGNITED PHOTOGRAPHIC FLASH LAMP

[75] Inventors: Warren Green, North Chili; Richard A. Colleluori, Rochester, both of N.Y.

[73] Assignee: Eastman Kodak Company, Rochester, N.Y.

[21] Appl. No.: 08/940,080

[22] Filed: Sep. 29, 1997

[51] Int. Cl.$^6$ ................................. F21K 5/12; C06C 9/00
[52] U.S. Cl. ............................................. 431/358; 102/205
[58] Field of Search ..................... 431/357, 358, 431/361, 363; 102/205; 362/3; 313/317

[56] References Cited

U.S. PATENT DOCUMENTS

| | | | |
|---|---|---|---|
| 8,820 | 3/1852 | Ball | 102/205 |
| 684,499 | 10/1901 | Duthie | 431/357 |
| 795,954 | 8/1905 | Brant | 102/275.6 |
| 1,163,479 | 12/1915 | Staight | 431/357 |
| 1,235,282 | 7/1917 | Bradshaw | 396/155 |
| 1,330,149 | 2/1920 | Swafford | 431/357 |
| 2,024,225 | 12/1935 | Igari | 431/361 |
| 3,180,240 | 4/1965 | Bohme et al. | 362/3 |
| 3,540,819 | 11/1970 | Shaffer et al. | 431/361 |
| 3,717,432 | 2/1973 | Demchock, Jr. et al. | 431/361 |
| 3,942,445 | 3/1976 | Baker et al. | 102/205 |
| 4,515,080 | 5/1985 | Bell | 102/205 |
| 4,846,067 | 7/1989 | Martin | 102/205 |

FOREIGN PATENT DOCUMENTS

| | | | |
|---|---|---|---|
| 405248 | 1/1934 | United Kingdom | 431/361 |
| 1446658 | 8/1976 | United Kingdom . | |

*Primary Examiner*—Alan Cariaso
*Attorney, Agent, or Firm*—Gordon M. Stewart

[57] ABSTRACT

A photographic flash lamp having a closed, at least partially transparent capsule. A combustible material within an enclosed region of the capsule generates a flash upon ignition. Ignition is provided by a frictionally ignited composition within the enclosed region and an ignitor to frictionally engage with the composition. A frictional ignitor assembly extends between an interior and exterior of the enclosed region and carries one of the composition or ignitor. Movement of an exterior end of the ignitor assembly causes the frictional ignitor and frictionally ignited composition to frictionally engage one another resulting in flash generation. Particularly with a sliding piston arrangement for engaging the ignitor and frictionally ignited composition, ignition can be accomplished with very low cost components such as a spring while at the same time, combustion gases are trapped within the closed envelope.

4 Claims, 1 Drawing Sheet

ENCLOSED FRICTIONALLY IGNITED PHOTOGRAPHIC FLASH LAMP

FIELD OF THE INVENTION

This invention relates generally to the field of photography, and in particular to photographic flash lamps used for producing a flash of light during picture taking.

BACKGROUND OF THE INVENTION

The use of various means to produce a flash during exposure of a photographic image, is well known. Currently, electronic flash units using xenon or the like, flash tubes, are typically used. While such electronic flash units are reliable and produce many flashes during their lifetime, they represent a substantial fixed cost component of the camera. For most cameras, this is not a problem since, compared to the rest of the camera components, the fixed cost of an electronic flash unit is relatively low and so does not influence the price of the camera much.

In recent years though, so called "single use cameras" (sometimes referred to as "film with lens" or similar terms) have become available. These cameras are sold to the end user with film pre-loaded in them, and are provided with an associated indication (usually in express written instructions on them) that the entire camera is to be returned to a processor for processing of the film. At the processor, the film is removed for processing but the camera is not returned to the user (often they are repaired as necessary and re-loaded with film for sale as a single use camera again). It is necessary in such camera to keep component cost as low as possible. In such single use cameras or other low cost cameras, the fixed cost of an electronic flash unit represents a substantial proportion of the overall camera cost which it would be desirable to reduce.

Combustion flash units which produce a flash by rapid combustion of a suitable material, were well known historically. Ignition of the combustible material was timed to occur close to the opening of a camera shutter to expose a photographic film. Many such devices used a percussion ignition source which would be ignited by a blow to the ignition source, and would in turn ignite the combustible material which produced the flash. An example of such a combustion flash is disclosed, for example, in GB 1,446, 658. A difficulty with percussion ignitors is that a striker and some relatively complex activation mechanism for rapidly moving the striker, must be provided. While this may not normally appear to be an expensive proposition, in the context of single use cameras where costs must be minimized, costs of a striker and activation mechanism are a concern. Complex devices, in which openly exposed flash powder is ignited by a match, have been described in U.S. Pat. No. 684,499 and U.S. Pat. No. 1,330,149. However, such devices are clearly inappropriate for use with single-use cameras and also can release considerable noxious gasses and smoke during ignition.

It would be desirable then to provide a combustion flash unit, suitable for use with single-use cameras in particular, in which combustion can be initiated without the use of relatively mechanically complex percussion ignitor devices and which can allow little or no undesirable combustion gases to escape to the surrounding atmosphere.

SUMMARY OF THE INVENTION

The present invention then, provides a photographic flash lamp, comprising:

a closed, at least partially transparent capsule;

a combustible material within the closed capsule to generate a flash upon ignition;

a frictionally ignited composition within the closed capsule to ignite the combustible material;

an ignitor frictionally engageable with the composition;

a frictional ignitor assembly extending between the interior and exterior of the closed capsule and carrying one of the composition or ignitor, such that movement of an exterior end of the ignitor assembly causes the frictional ignitor and frictionally ignited composition to frictionally engage one another.

In a particular embodiment of the flash lamp of the present invention, the closed capsule has a first chamber within which the combustible material is disposed, and a cylinder communicating with the first chamber. Additionally, the frictional ignitor assembly in such an embodiment includes a piston slidably engaged in, and closing, the cylinder, to define a second cylindrical chamber of variable volume communicating with the first chamber. The piston carries one of the composition or ignitor, so that movement of the piston causes the friction ignitor and frictionally ignited composition to frictionally engage one another. Following this, the piston can slide in a direction to increase the volume of the second chamber and accommodate increased gas volume resulting from ignition of the combustible material.

The flash lamp of the present invention provides a frictional ignition arrangement while inhibiting or preventing combustion gases from escaping. Furthermore, in the particular embodiment described above, the frictional ignition system serves both to provide frictional ignition and serve as an expansion volume into which combustion gases can expand without escaping from the flash lamp.

BRIEF DESCRIPTION OF THE DRAWINGS

To facilitate understanding, identical reference numerals have been used, where possible, to designate identical elements that are common to the figures.

DETAILED DESCRIPTION OF THE INVENTION

Figure 1:
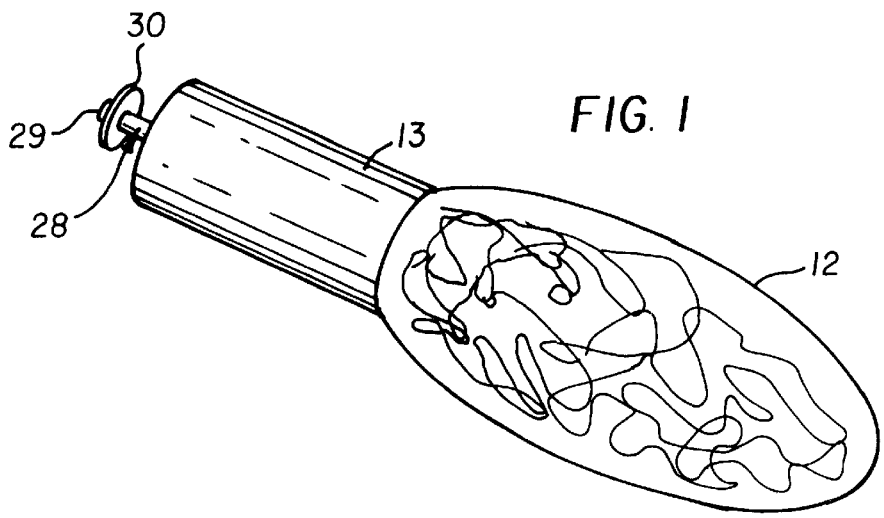
FIG. 1 is a perspective view of a photographic flash lamp of the present invention.
Figure 2:
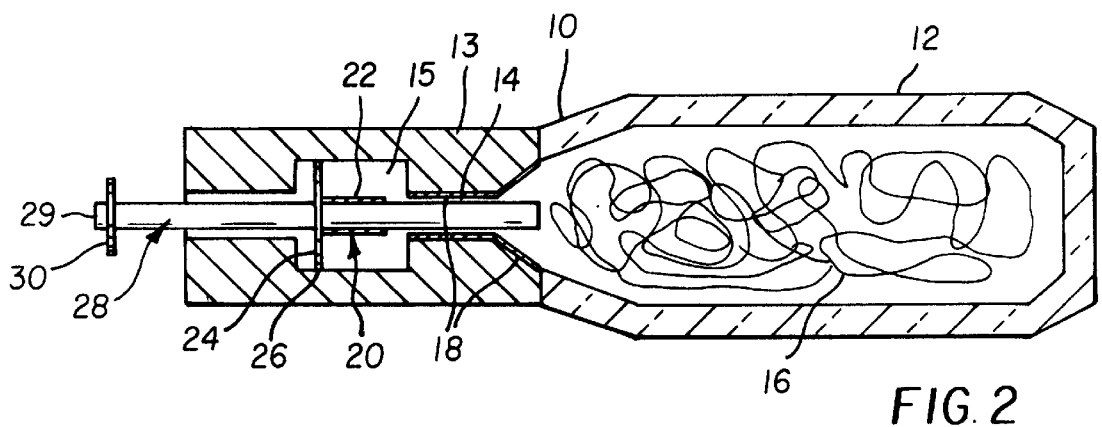
FIGS. 2 and 3 are lengthwise cross-section of the lamp of FIG. 1 illustrating operation of the lamp to cause ignition.
Figure 3:
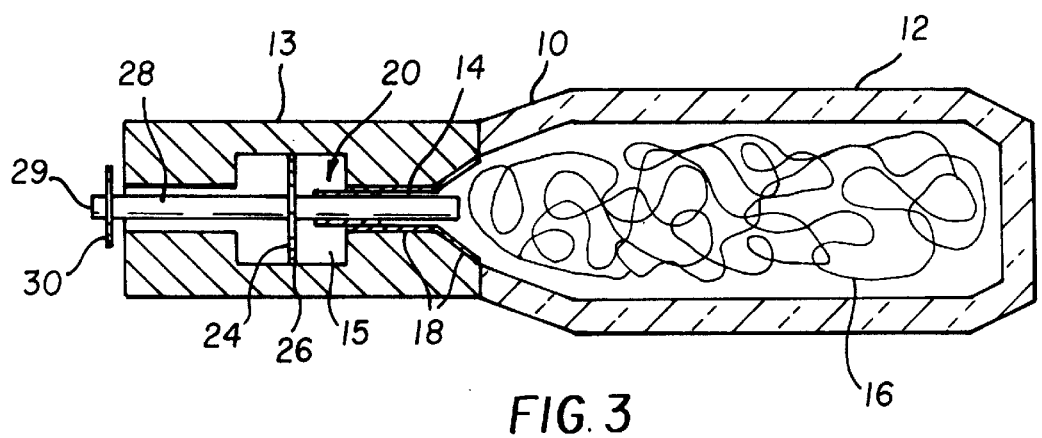

Referring to FIGS. 1 through 3, the flash lamp shown has a capsule 10 which includes a transparent glass bulb 12, defining a first chamber, and a metal or plastic base 13. A combustible material in the form of zirconium wire 16, is disposed within bulb 10. Base 13 defines a second chamber in the form of cylinder 15, which communicates with the first chamber defined by bulb 10 through a passage 14. A piston 20 is slidably engaged in cylinder 15 with a circular end 24 actually providing the sealing around a periphery 26 of end 24. A shaft 28 extends from piston 20 and out the base 13 to a remote end 29 of shaft 28. An end 29 of shaft 28 has a circular stop disk 30 securely attached thereto.

Piston 20 then, defines with cylinder 15, a cylindrical chamber of variable volume which is in communication with the chamber defined by bulb 12. The chamber is filled with pressurized oxygen, for example, at about 5 atmospheres pressure, to support combustion. The range of volumes of this variable volume chamber varies between a maximum when piston 20 is at a leftmost position in which end 24 abuts against the leftmost end (as viewed in FIGS. 2 and 3)

of cylinder 15, and a minimum volume when stop 30 prevents further inward movement of shaft 28 and hence of piston 20.

The surface defining passage 14 and a portion of an inside surface of bulb 12 are coated with a frictionally ignitable composition 18. A cylindrical extension 22 of piston 20 is coated with a coarse grit which acts as an ignitor to ignite composition 18 when the grit frictionally engages with composition 18. Suitable ignitor compositions include a mixture of potassium chlorate, phosphorous, zirconium powder, and a binder. A suitable grit is aluminum oxide powder.

In operation, end 29 of plunger is pressed causing piston 20 to move inwardly between a position shown in FIG. 2, to reduce the variable volume chamber defined by piston 20 and cylinder 15, toward the minimum volume position (FIG. 3 showing piston 20 only part way toward the minimum volume position). The pressing can be accomplished with a very simple mechanism, such as by release of tension on a compressed spring (not shown). This causes the grit on extension 22 to frictionally engage with, and ignite, ignitor composition 18 in passage 14, which in turn ignites the remainder of ignitor composition 18 and cause wire 16 to ignite. Stop 30 prevents circular end 24 of piston 20 from crashing into the end of cylinder 15. After ignition of wire 18, piston 20 can move to the left (as viewed in FIGS. 2, 3) so that the variable volume cylindrical chamber defined by piston 20 and cylinder 15, can again increase to absorb some of the increased pressure resulting from combustion gases while all the time, combustion gasses are trapped inside the closed capsule. Since stop 30 prevents circular end 24 from crashing into the cylinder end, this ensures that the sealing of the closed capsule will not be broken during the ignition process.

A test was run using a friction type ignitor to cause a flash mixture of Zirconium powder, binder and oxidant to react and cause a flash of light. The friction ignitor rod was coated with a grit material mixed with a binder. The rod was pushed through a cavity with a diameter 0.010" greater than the rod and this cavity was coated with a primer made of red phosphorous, powdered Zirconium, oxidant and a binder. When the rod with the grit coating made contact with the cavity with the primer coating, as it was pushed through the cavity, a reaction took place causing high temperature sparks, which in turn ignited the flash mixture and created a flash of light. The flash of light was measured in candela seconds and gave a reading of 135. The mixtures used are listed below. The mixtures were made in large batches to get a good mix, and doled out in smaller units by weight to be used. The dry flash mix weight used was 43 mg. and the dry primer weight used was 16.5 mg.

| Flash Mixture | Friction Mixture |
| --- | --- |
| Zirconium 3 micron - 130 mg. | KC103 - .0418 grams |
| Zirconium −325 mesh - 350 mg. | phosphorous - .025 grams |
| kclo4 - 375 mg. | Zirconium −325 mesh - .0988 grams |
| 0.5% binder | 0.5% binder |
|  | Grit = AL2O3 - .0833 grams |

In an alternate arrangement of a flash lamp of the present invention, the lamp can be constructed just as shown in FIG. 3, with the piston extension 22 already inside neck 14. In such an embodiment ignition can be accomplished by rotating shaft 28 at end 29 by a means such as a wound spiral spring. This rotation causes frictional engagement of the grit on extension 22 with the ignitor composition in neck 14 with subsequent ignition of wire 16. Furthermore, it will be appreciated that the locations of the grit and the ignitor composition can be reversed in either embodiment, or a mixture of both used in both locations.

It will be understood that other variations and modifications can be effected within the spirit and scope of the invention. Accordingly, the present invention is not limited to such specifically described embodiments.

PARTS LIST 10 capsule
12 bulb
13 metal base
14 passage
15 cylinder
16 zirconium wire
18 frictionally ignitable composition
20 piston
22 cylindrical extension
24 circular end
26 periphery
28 shaft
29 remote end
30 circular stop disk

What is claimed is:

1. A photographic flash lamp, comprising:

a closed, at least partially transparent capsule;

a combustible material within an enclosed region of the capsule to generate a flash upon ignition;

a frictionally ignited composition within the enclosed region to ignite the combustible material;

an ignitor frictionally engageable with the composition;

a frictional ignitor assembly extending between an interior and exterior of the enclosed region and carrying one of the composition or ignitor, such that movement of an exterior end of the ignitor assembly causes the frictional ignitor and frictionally ignited composition to frictionally move against one another.

2. A photographic flash lamp according to claim 1 wherein:

the closed capsule has a first chamber within which the combustible material is disposed, and a cylinder communicating with the first chamber; and the frictional ignitor assembly includes a piston slidably engaged in, and closing, the cylinder, to define a second cylindrical chamber of variable volume communicating with the first chamber, the piston carrying one of the composition or ignitor, so that movement of the piston causes the friction ignitor and frictionally ignited composition to frictionally move against one another following which the piston can slide in a direction to increase the volume of the second chamber and accommodate increased gas volume resulting from ignition of the combustible material.

3. A photographic flash lamp according to claim 2 wherein pressing of the cylinder in a first direction to decrease the volume of the second chamber, causes one of the composition or ignitor to slidably engage with the other.

4. A photographic flash lamp according to claim 2 wherein only rotation of the piston causes one of the composition or ignitor to frictionally move against the other upon rotation of the shaft.

* * * * *